United States Patent
Cole et al.

(10) Patent No.: US 9,903,489 B2
(45) Date of Patent: Feb. 27, 2018

(54) PNEUMATIC PRESSURE RELIEF TEST PLUG

(71) Applicant: IPS Corporation, Collierville, TN (US)

(72) Inventors: Steven R. Cole, Collierville, TN (US); Richard Larson, Victoria, MN (US)

(73) Assignee: IPS CORPORATION, Collierville, TN (US)

( * ) Notice: Subject to any disclaimer, the term of this patent is extended or adjusted under 35 U.S.C. 154(b) by 86 days.

(21) Appl. No.: 14/743,508

(22) Filed: Jun. 18, 2015

(65) Prior Publication Data

US 2016/0369928 A1    Dec. 22, 2016

(51) Int. Cl.
*F16K 15/20*   (2006.01)
*F16L 55/124*  (2006.01)
*F16L 55/134*  (2006.01)

(52) U.S. Cl.
CPC ............ *F16K 15/20* (2013.01); *F16L 55/124* (2013.01); *F16L 55/134* (2013.01); *Y10T 137/7884* (2015.04)

(58) Field of Classification Search
CPC ....... F16L 55/11; F16L 55/134; F16L 55/124; F16K 15/20; F16K 7/10; F16K 15/207; Y10T 137/3646; Y10T 137/88054; Y10T 137/3786; Y10T 137/7889; Y10T 137/7884; Y10T 137/789; Y10T 137/7891; Y10T 137/7892; Y10T 137/7893; Y10T 137/7894
USPC ...... 137/224, 226, 68.1, 362, 848, 854–858; 138/90, 93, 89, 94, 89.3; 134/167 C; 604/99.03, 102.01–102.03, 247
See application file for complete search history.

(56) References Cited

U.S. PATENT DOCUMENTS 1,177,388 A   3/1916   Crane
2,588,188 A   3/1952   Weisman
(Continued)

FOREIGN PATENT DOCUMENTS

CA   2682475   9/2010
CA   2692954   9/2010

OTHER PUBLICATIONS

G.T. Water Products, Inc.; SAFE-T-SEAL Test Plugs product information (5 pgs.) http://www.gtwaterproducts.com/safe.html (cited visited Nov. 7, 2008).

(Continued)

*Primary Examiner* — Craig J Price
(74) *Attorney, Agent, or Firm* — Womble Bond Dickinson (US) LLP

(57) ABSTRACT

A pneumatic test plug and inflation assembly for the same are provided. The pneumatic test plug may include an inflatable bladder formed by a bladder wall that is elastically deformable, the bladder wall having at least one open end. A housing may be disposed in the open end of the bladder wall, the housing having a mounting surface. An inflation valve may be mounted to the mounting surface, with the inflation valve having an interior end in fluid communication with an interior area of the bladder. The inflation valve may define a main air passageway through which air is introduced into the interior area. The mounting surface may be recessed into the interior area of the bladder relative to the open end in the bladder wall such that the housing defines a cavity within the inflatable bladder.

15 Claims, 8 Drawing Sheets

(56) References Cited

U.S. PATENT DOCUMENTS

| | | | |
|---|---|---|---|
| 3,129,726 A * | 4/1964 | Moore | F16K 7/10 |
| | | | 138/89 |
| 3,213,672 A | 10/1965 | On | |
| 3,231,149 A * | 1/1966 | Yuza | A23G 3/28 |
| | | | 137/853 |
| 3,241,571 A | 3/1966 | Gracia | |
| 3,291,156 A | 12/1966 | Corsano | |
| 3,457,959 A | 7/1969 | Cooper | |
| 3,494,504 A | 2/1970 | Jackson | |
| 3,613,936 A | 10/1971 | Kaiser et al. | |
| 3,667,640 A | 6/1972 | Morrow | |
| 4,036,261 A | 7/1977 | Hauk et al. | |
| 4,040,450 A | 8/1977 | Boundy | |
| 4,202,377 A | 5/1980 | Harrison | |
| 4,303,101 A | 12/1981 | Tholen | |
| 4,312,708 A | 1/1982 | Leslie | |
| 4,381,800 A | 5/1983 | Leslie | |
| 4,493,344 A | 1/1985 | Mathison et al. | |
| 4,542,642 A | 9/1985 | Tagliarino | |
| 4,585,033 A | 4/1986 | Westman | |
| 4,614,206 A | 9/1986 | Mathison et al. | |
| 4,658,861 A | 4/1987 | Roberson, Sr. | |
| 4,820,474 A | 4/1989 | Leslie et al. | |
| 5,035,266 A | 7/1991 | Benson et al. | |
| 5,076,328 A | 12/1991 | Lyon | |
| 5,131,433 A | 7/1992 | Sion et al. | |
| 5,181,977 A | 1/1993 | Gneiding et al. | |
| 5,209,266 A | 5/1993 | Hiemsoth | |
| 5,234,034 A | 8/1993 | Lyon | |
| 5,348,085 A | 9/1994 | Benson | |
| 5,353,841 A | 10/1994 | Mathison et al. | |
| 5,413,136 A | 5/1995 | Prescott | |
| 5,771,937 A | 6/1998 | Collins | |
| 5,778,923 A | 7/1998 | Marston | |
| 6,116,286 A | 9/2000 | Hooper et al. | |
| 6,230,327 B1 | 5/2001 | Briand et al. | |
| 6,427,714 B2 | 8/2002 | Freigang et al. | |
| 6,502,603 B2 | 1/2003 | Lane, Jr. | |
| 6,513,549 B2 | 2/2003 | Chen | |
| 6,901,966 B2 | 6/2005 | Onuki et al. | |
| 7,013,926 B1 | 3/2006 | Storey et al. | |
| 7,021,337 B2 | 4/2006 | Markham | |
| 7,325,574 B1 | 2/2008 | Beckey | |
| 7,404,412 B2 | 7/2008 | Milanovich et al. | |
| 7,597,118 B1 | 10/2009 | Peterson et al. | |
| 7,866,347 B2 | 1/2011 | Bowie | |
| 8,042,576 B2 | 10/2011 | Peterson et al. | |
| 8,256,467 B1 | 9/2012 | Larson et al. | |
| 2010/0163254 A1 * | 7/2010 | Saltel | F16L 55/134 |
| | | | 166/387 |

OTHER PUBLICATIONS

G.T. Water Products, Inc.; New Innovations (2 pgs.); http://www.gtwaterproducts.com/new.html (cited visited Nov. 7, 2008).

Cherne Industries Inc.; Pneumatic Plugs—Single-Size Test-Ball® (3/4" through 6") product information (1 pg.) www.cherneind.com.

Cherne Industries Inc.; Pneumatic Plugs—Single-Size Test-Ball® (8" through 12") product information (1 pg.) www.cherneind.com.

Cherne Industries Inc.; Pneumatic Plugs—Clean-Seal® Plugs product information (1 pg.) www.cherneind.com.

Cherne Industries Inc.; Pneumatic Plugs—Long Test-Ball® & MS2® Test-Ball product information (1 pg.) www.cherneind.com.

IPS Corporation; Multi-Size Pneumatic Pipe Plugs product information (1 pg.).

Office Action from Canadian Patent Application No. 2,692,954 dated Mar. 2, 2012.

Cherne Industries Inc.; Product Catalog; dated Jan. 2009; Revised Jun. 2010; 35 pages.

Patent Examination Report for Australian Application No. 2016202482 dated Jul. 29, 2016.

First Examination Report for New Zealand Application No. 719190 dated Jul. 8, 2016.

Examination Report No. 2 for Australian Application No. 2016202482 dated Apr. 19, 2017.

Office Action for Canadian Application No. 2,927,341 dated Feb. 17, 2017.

* cited by examiner

PNEUMATIC PRESSURE RELIEF TEST PLUG

FIELD OF THE INVENTION

The present invention relates to plug devices for use in pipe systems, and more particularly to pneumatic test plug devices for sealing pipes or conduits at access ports and tee-connections.

BACKGROUND OF THE INVENTION

Pipe or plumbing systems often include access openings or ports that allow the interior of the pipes of the pipe system to be inspected and/or cleaned. Access opening configurations for such pipe systems can vary in size and shape, although many configurations are standardized. In one common configuration, an access opening (often referred to as a "clean-out") is provided at the end of a relatively short section of cylindrical pipe that extends away from the axis of the main pipe section. Clean-outs may extend from a main pipe section at any angle. Those that extend approximately 90 degrees from the main pipe section are commonly called "clean-out tees" (referring to the T-shape created by the intersecting pipe sections). Other access openings include, but are not limited to, roof vents, storm drains, closet bends, and pipe ends.

Access openings may also be used to test the integrity of the pipe system. Currently, this is accomplished by placing temporary test plugs in the clean-outs or other openings of the pipe system. A test media such as water or air is then introduced into the pipe system for a period of time to determine if there are any leaks. After successful testing, the test plugs are removed. Test plugs can generally be categorized into mechanical test plugs and pneumatic test plugs. Existing mechanical test plugs typically include devices that seal pipe systems via mechanical activation, such as by turning a threaded connection member to expand an elastomeric ring that seals an inner surface of a pipe section. Existing pneumatic test plugs include elongate elastomeric bladders that are attached directly to an air source. The bladders are inserted into the pipe system through the clean-outs or other access openings and are then inflated to seal the pipe section. After testing, the test plugs are deflated or deactivated and then removed from the pipe system.

Although some existing pneumatic test plugs may display a maximum inflation pressure on the outside of the bladder, this does not provide protection for overinflation, but instead relies on the diligence of the operator and the existence and accuracy of an air inlet pressure gauge. If the elastomeric bladders of such pneumatic test plugs were to be overinflated, problems could occur. These problems may include damage to the test plug, damage to the pipe system, and/or other inconveniences for the operator. A proposed solution to this problem involves using an external pressure regulator or external pressure relief device on the air inlet, but these solutions are cumbersome and are often ignored by operators. They also increase the time required to inflate the bladder. Additionally, many pressure regulators must be set before inflation begins, and regulation settings may differ for pipes having different internal diameters.

Other existing pneumatic test plugs include integrated pressure relief devices; however, the present inventors have found that these particular pressure relief devices tend to leak, do not provide repeatable results, and may disrupt testing of the pipe system. Specifically, some pneumatic test plugs include relief valves that have mechanical springs and seals; other pneumatic test plugs include relief valves that are positioned on the backside of the elastomeric bladder. The present inventors have found that pneumatic test plugs employing the former pressure relief devices may be prone to fouling and tend to collect contamination, thus negatively affecting their performance. Similarly, the present inventors have found that pneumatic test plugs employing the latter pressure relief devices may release excess air into the enclosed area of the pipe system behind the test plug, thus tending to force the test plug out of the clean-out access area and disrupting the test.

As a result, there is a need for an improved pneumatic test plug for use with a pipe section having a generally cylindrical internal pipe wall. The pneumatic test plug should be easy to use and should not require the operator to make additional settings or readings. It should be reliable, provide repeatable results, and it should not require additional external equipment or otherwise disrupt testing of the pipe system.

BRIEF SUMMARY OF VARIOUS EMBODIMENTS

Embodiments of the present invention include a pneumatic test plug for use with a pipe having a generally cylindrical internal pipe wall. The pneumatic test plug may include an inflatable bladder formed by a bladder wall that is elastically deformable, the bladder wall having at least one open end. The pneumatic test plug may include a housing disposed in the open end of the bladder wall, the housing having a mounting surface. Embodiments of the pneumatic test plug may include an inflation valve mounted to the mounting surface, the inflation valve having an interior end in fluid communication with an interior area of the bladder, the inflation valve defining a main air passageway through which air is introduced into the interior area. The mounting surface may be recessed into the interior area of the bladder relative to the open end in the bladder wall such that the housing may define a valve cavity within the inflatable bladder.

In some embodiments, the inflation valve may further comprise a pressure release opening. The pressure release opening may be fluidly connected to the main air passageway. The inflation valve may further comprise a stem portion configured to engage the mounting surface, and the inflation valve may further comprise a sleeve portion disposed about the stem portion. Embodiments of the pressure release opening may be defined in the stem portion such that the sleeve portion may be configured to seal the pressure release opening when the inflatable bladder is not overinflated. In some embodiments, the sleeve portion may be configured to deflect away from the stem portion when the inflatable bladder is overinflated such that air is released from the interior area of the inflatable bladder to an exterior environment. The pressure release opening may be disposed within the valve cavity of the housing, such that the pressure release opening may also be recessed into the interior area of the bladder relative to the open end.

In some embodiments, the inflation valve may further comprise a fill opening configured to receive air to inflate the bladder.

The bladder wall may further comprise an annular portion proximate the at least one open end that is configured to retain the housing. In some embodiments, a clamp may be disposed about the annular portion such that the clamp may be configured to compress the bladder wall to retain the housing.

In some embodiments, the inflation valve may be disposed entirely within the valve cavity of the housing.

In some embodiments, the bladder may be configured to elongate during inflation. A portion of the bladder wall disposed at a closed end of the bladder opposite the open end may be thicker than at least a portion of a remainder of the bladder wall.

In another embodiment of the present invention, an inflation valve assembly may be provided for use with an inflatable bladder formed by a bladder wall that is elastically deformable. The bladder may have an open end. The inflation valve assembly may comprise a housing disposed in the open end of the bladder wall, the housing having a mounting surface; and an inflation valve mounted to the mounting surface, the inflation valve having an interior end in configured to fluidly communicate with an interior area of the bladder, the inflation valve defining a main air passageway configured to introduce air into the interior area. The mounting surface may be configured to be recessed into the interior area of the bladder relative to the open end in the bladder wall such that the housing is configured to define a valve cavity within the inflatable bladder.

In some embodiments, the inflation valve may further comprise a pressure release opening. The pressure release opening may be fluidly connected to the main air passageway. The inflation valve may further comprise a stem portion configured to engage the mounting surface, and the inflation valve may further comprise a sleeve portion disposed about the stem portion. The pressure release opening may be defined in the stem portion such that the sleeve portion may be configured to seal the pressure release opening when the inflatable bladder is not overinflated.

In some embodiments, the sleeve portion may be configured to deflect away from the stem portion when the inflatable bladder is overinflated such that the inflation valve may be configured to release air from the interior area of the inflatable bladder to an exterior environment. The pressure release opening may be disposed within the valve cavity of the housing, such that the pressure release opening may also be recessed into the interior area of the bladder relative to the open end.

In some embodiments, the inflation valve may further comprise a fill opening configured to receive air to inflate the bladder.

BRIEF DESCRIPTION OF THE DRAWINGS

Figure 1:
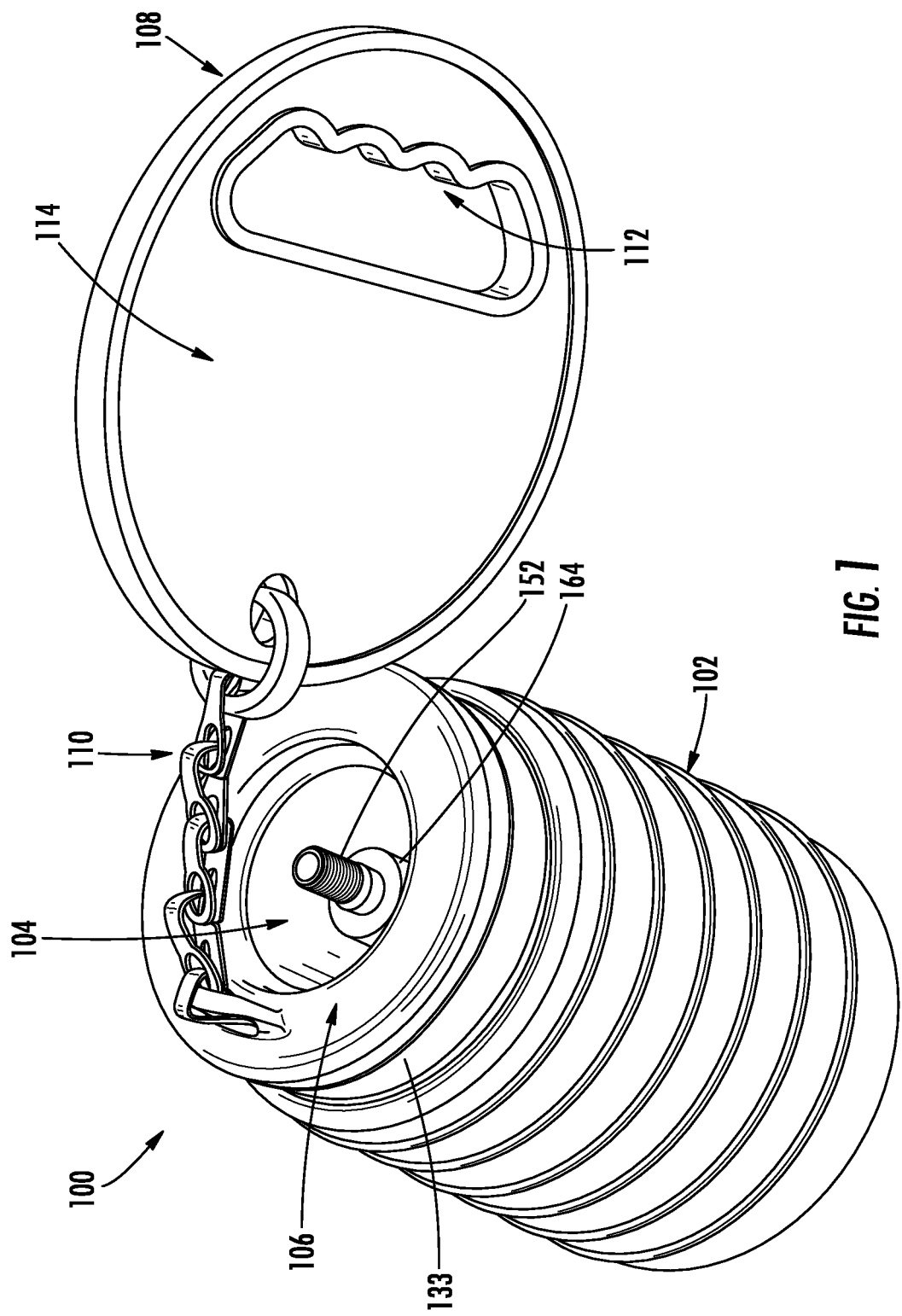
Figure 2:
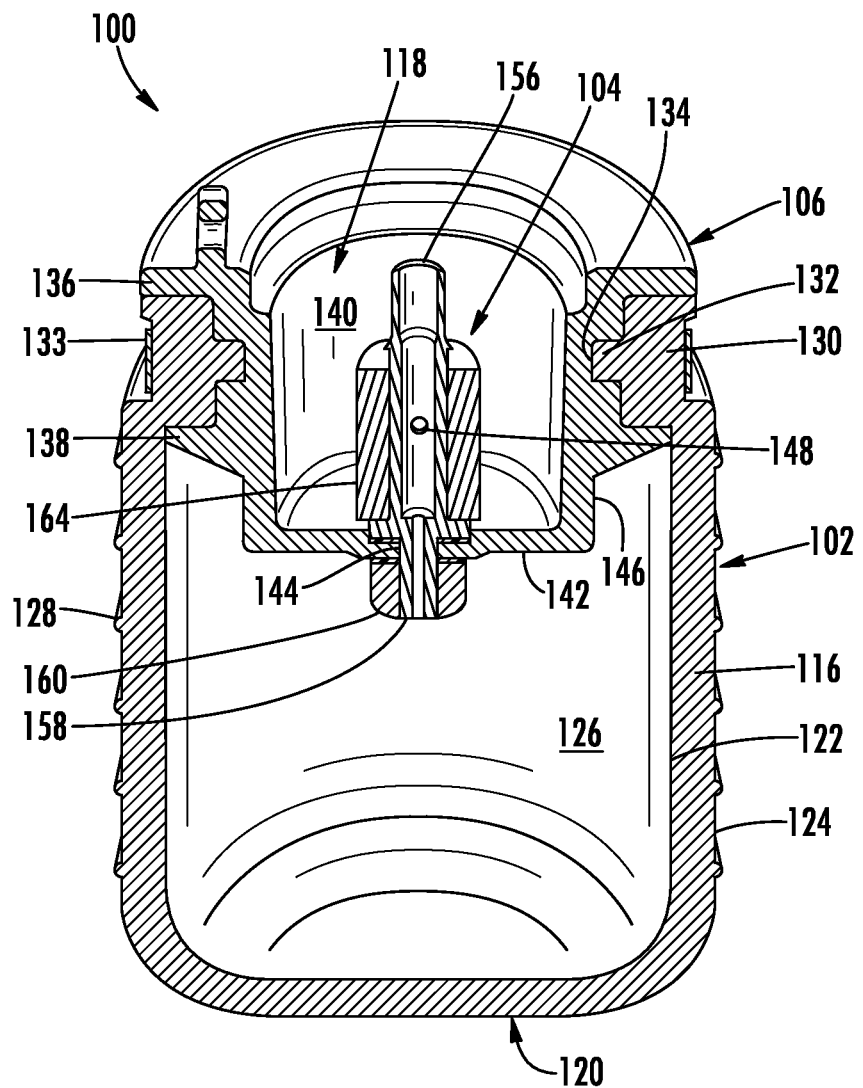
Figure 3:
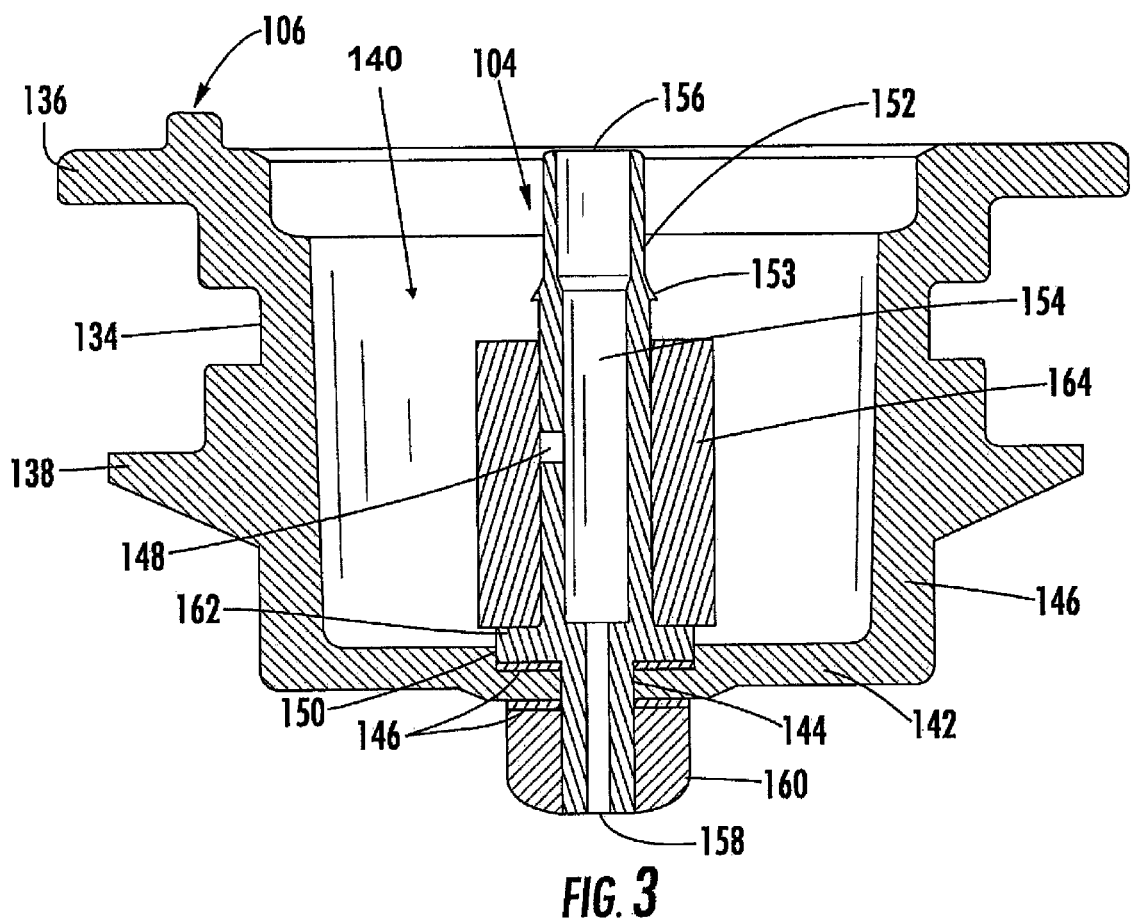
Figure 4:
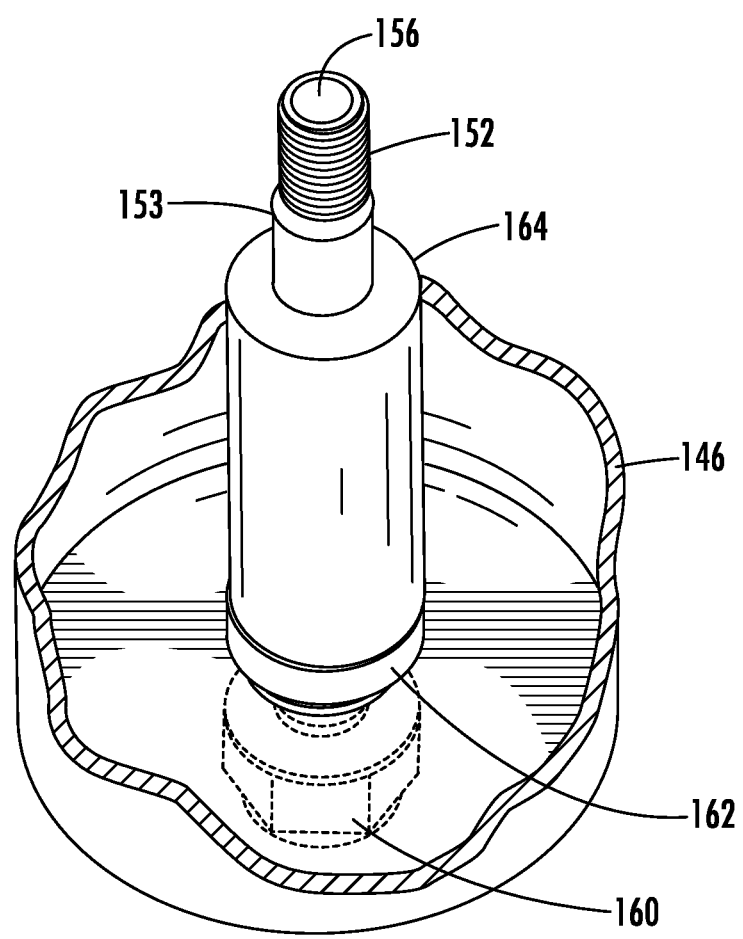
Figure 5:
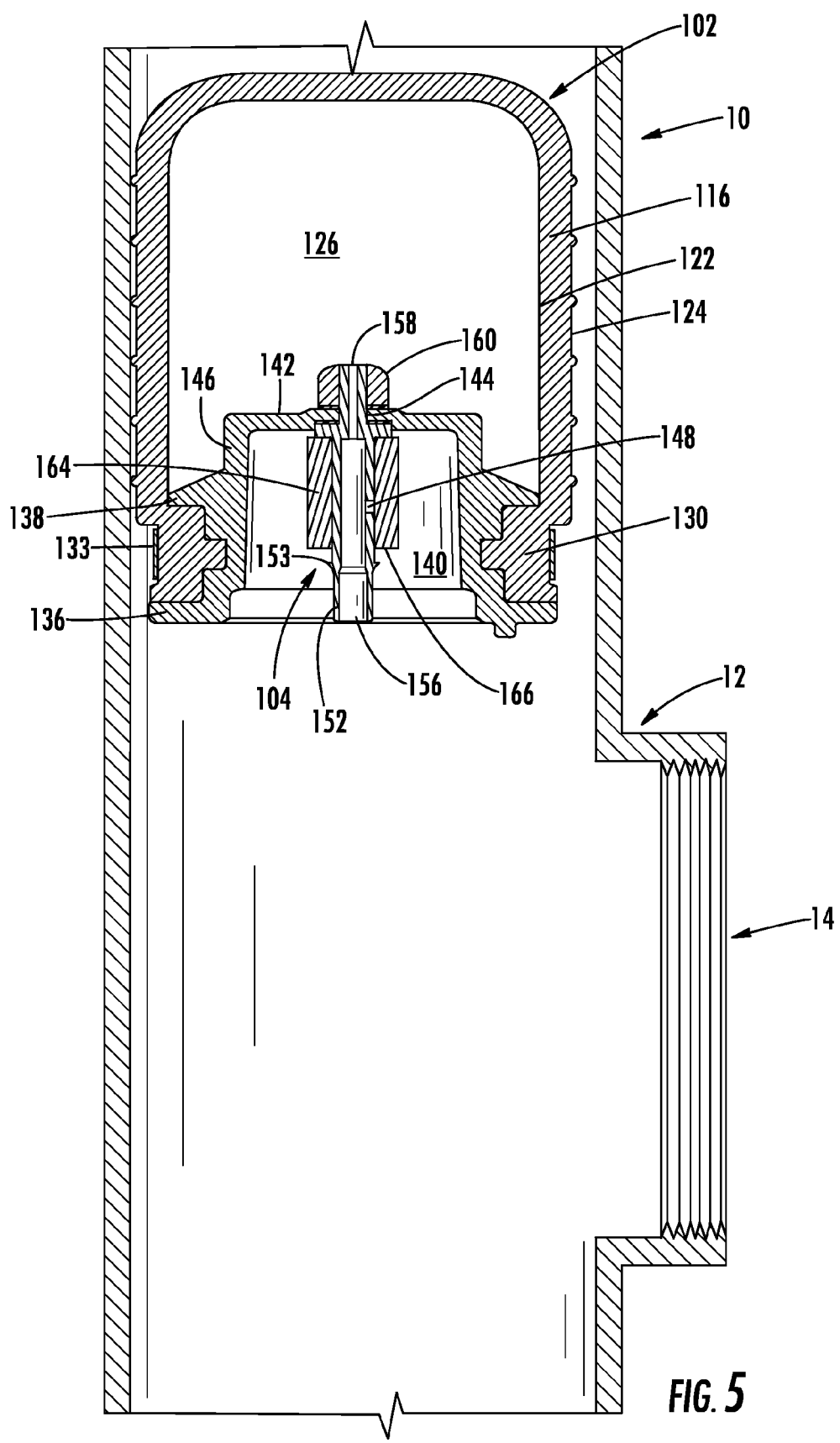
Figure 6:
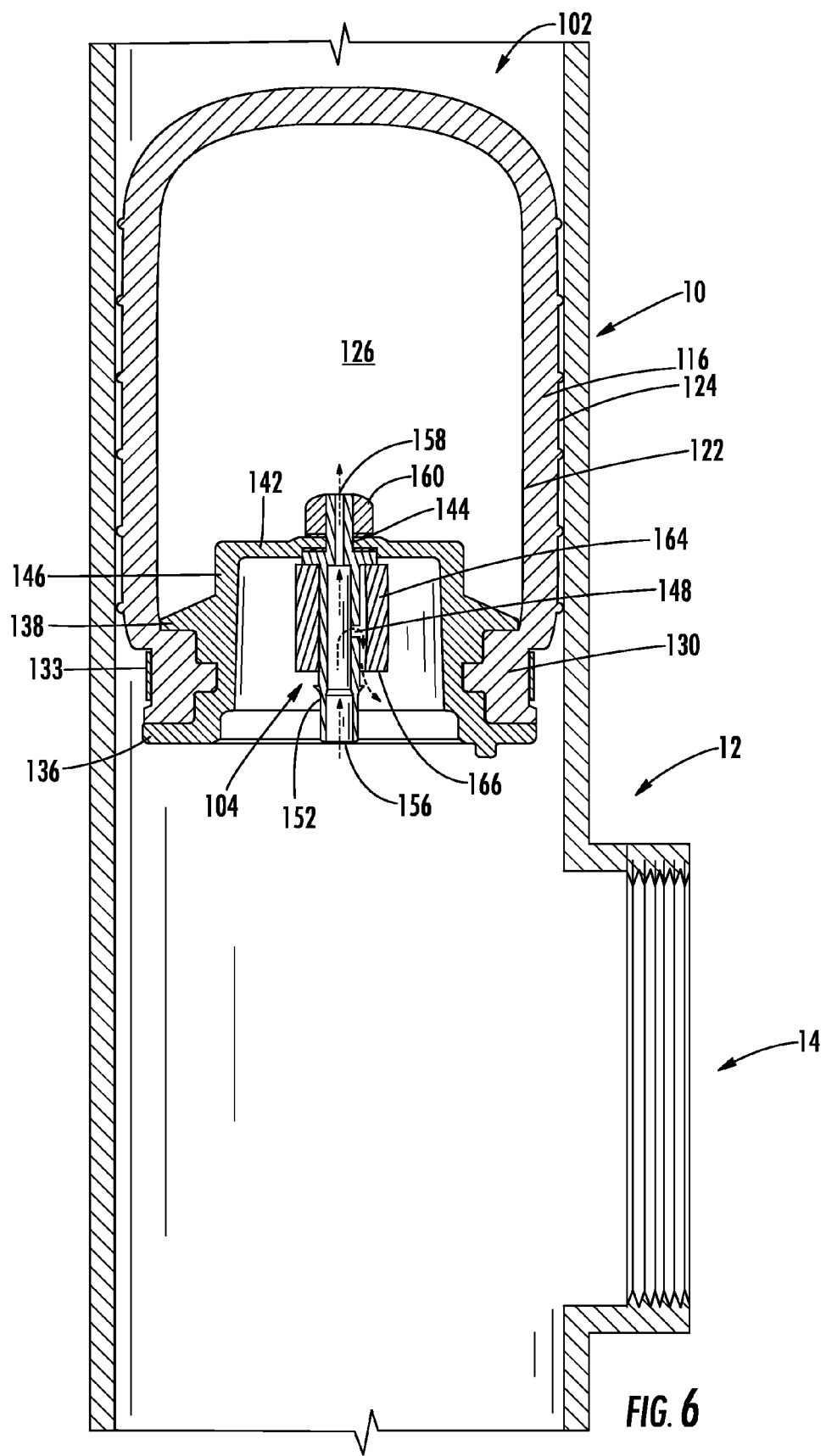
Figure 7:
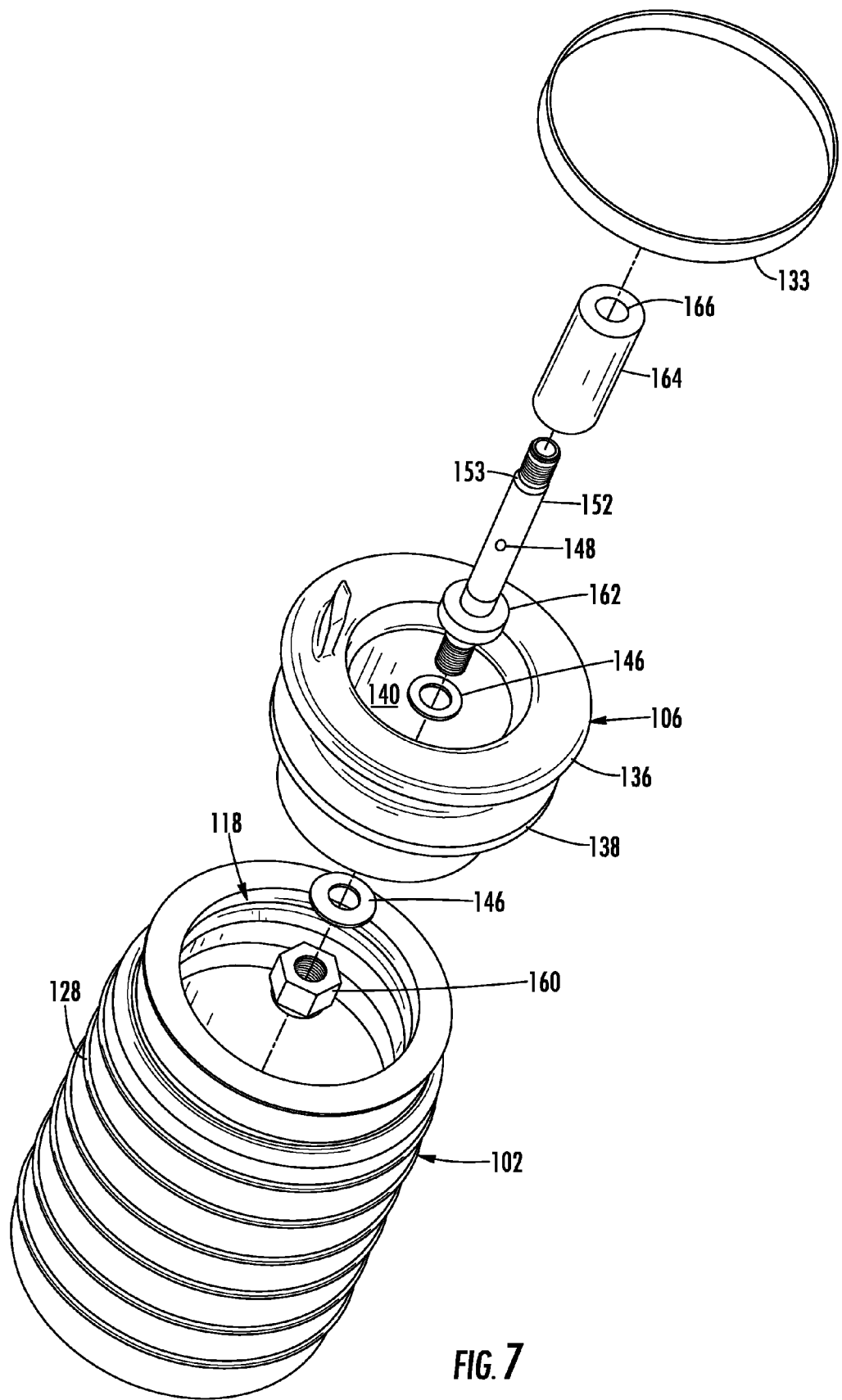
Figure 8:
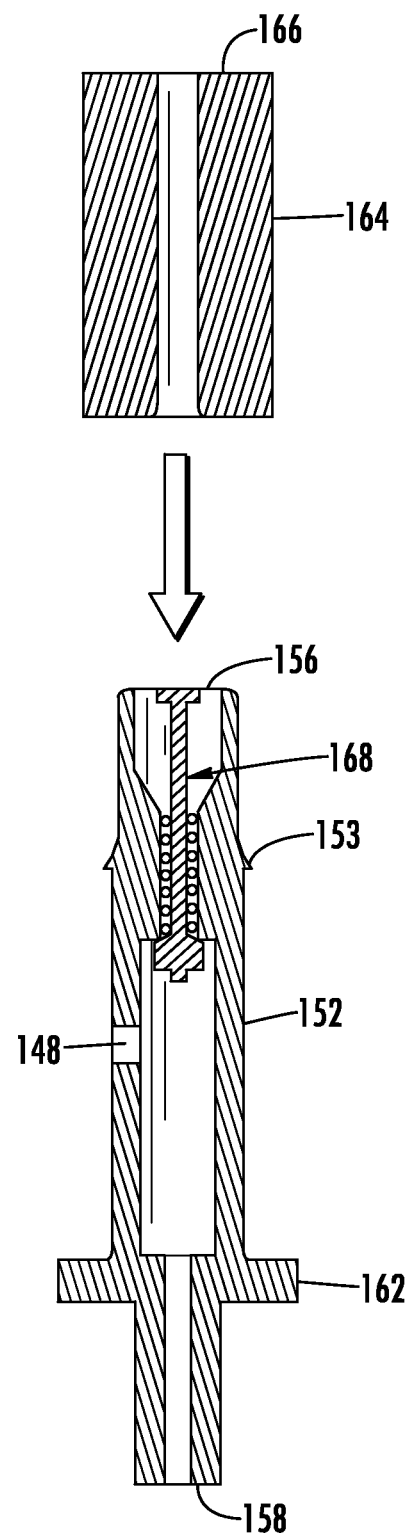

Having thus described the invention in general terms, reference will now be made to the accompanying drawings, which are not necessarily drawn to scale, and wherein:

FIG. 1 is a perspective view of a pneumatic test plug in accordance with an embodiment of the present invention;

FIG. 2 is a perspective, cross-section view of a pneumatic test plug in accordance with an embodiment of the present invention;

FIG. 3 is a cross-section view of an inflation valve and housing in accordance with an embodiment of the present invention;

FIG. 4 is a perspective view of an inflation valve and a portion of a housing in accordance with an embodiment of the present invention;

FIG. 5 is a cross-section view of a clean-out tee and a pneumatic test plug shown in an uninflated condition in accordance with an embodiment of the present invention;

FIG. 6 is a cross-section view of the clean-out tee and pneumatic test plug of FIG. 5 shown in an overinflated condition in accordance with an embodiment of the present invention;

FIG. 7 is an exploded view of a pneumatic test plug in accordance with an embodiment of the present invention; and FIG. 8 is a cross-section view of an inflation valve in accordance with an embodiment of the present invention.

DETAILED DESCRIPTION

The present invention will now be described more fully hereinafter with reference to the accompanying drawings, in which some but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "bottom," "top," "upper," "lower," "interior," "exterior," and similar terms are used for ease of explanation and refer generally to the position of certain components of embodiments of the described invention in the installed configuration (e.g., in an operational configuration). It is understood that such terms are not used in any absolute sense, and, as such, a component described as a "bottom wall" may be on the same level (e.g., at the same distance from the ground) as another component described as a "side wall" or an "upper end" in certain configurations of embodiments of the described invention, such as when components overlap in the pneumatic test plug. Moreover, in some embodiments, the pneumatic test plugs described herein may be configured to be installed in more than one orientation to accommodate different types of connections. For example, in one installation scenario, one end of the pneumatic test plug may be disposed such that it forms an "upper" end (e.g., pointing vertically upwards), whereas in another installation scenario that same end of the pneumatic test plug may be disposed such that it forms a "lower" or "bottom" end of the pneumatic test plug (e.g., pointing vertically downwards).

The present invention describes various embodiments of a pneumatic test plug that is configured, in an uninflated condition, to be inserted into a pipe section through an access port or opening. In operation, the pneumatic test plug may be inflated to seal against the internal pipe wall of the pipe section. After being used, it may be deflated and removed from the pipe section. In general, the pneumatic test plug of the present invention may include an inflation valve that is recessed within the interior area of the bladder. In some embodiments, the pneumatic test plug may have at least one release orifice in a side wall of the inflation valve, wherein overinflation of the bladder causes a portion of the inflation valve to separate from the stem of the inflation valve, thus releasing air from the interior area to the environment through the release orifice.

FIG. 1 shows a perspective view of a pneumatic test plug 100 in accordance with an embodiment of the present invention. In general, the pneumatic test plug 100 includes a bladder 102, an inflation valve 104 and a housing 106 for the inflation valve. The pneumatic test plug may include a handle device 108, which in various embodiments may be attached to the pneumatic test plug 100. The handle device 108 may facilitate removal of the pneumatic test plug 100 from the pipe section through the clean-out access opening or port. Additionally or alternatively, the handle device 108 may prevent the pneumatic test plug from falling farther into a pipe. In the depicted embodiment the handle device 108 is attached to the pneumatic test plug 100 via the housing 106, although in other embodiments it may be attached to the bladder 102 and/or any other component of the pneumatic test plug 100. In the depicted embodiment, the handle device 108 is attached to the pneumatic test plug with an attachment chain 110, however in other embodiments any suitable attachment means may be used including, but not limited to, rope, cable, wire, chain, etc. Although in various embodiments the handle device 108 may have other configurations, the handle device 108 of the depicted embodiment has a generally circular profile and includes a gripping portion 112 configured to allow an operator's fingers to pass therethrough. In various embodiments the handle device 108 may also have other functions; for example, it may include a surface 114 that may display text or symbols that instruct the operator how to properly use the pneumatic test plug 100. The handle device 108 may also display a particular color that may signify that a test plug is in use, such as, for example, orange, yellow, or red. In the depicted embodiment the handle device 108 is constructed of a plastic material and the attachment chain is constructed of a metal material; however, in other embodiments the handle device and/or the attachment means may be constructed of any suitable materials including, but not limited to, metal, plastic, and composite materials, and combinations thereof.

FIG. 2 is a perspective, cross-section view of a pneumatic test plug 100 in accordance with an embodiment of the present invention, showing the bladder 102, inflation valve 104, and housing 106. In the depicted embodiment, the bladder 102 defines a bladder wall 116 and has an open end 118 and a second, closed end 120. In some embodiments, both ends (e.g., ends 118, 120) of the pneumatic test plug may be open, such that each end may receive a valve and housing. For example, longer plugs may utilize valves at both ends to allow optional filling and/or pressure release selectively from one or both ends. In some other embodiments, both ends (e.g., ends 118, 120) of the pneumatic test plug may be open and may receive a cap or plug covering one of the openings. The bladder wall 116 may define an interior surface 122 and an exterior surface 124, and an interior area 126 may be partially bounded by the interior surface 122 of the bladder wall 116. In some embodiments, a series of ribs 128 are defined in the exterior surface 124 of the bladder wall 116 that extend around the exterior surface. Although other embodiments of the present invention need not include ribs 128, the ribs may help with sealing with the internal pipe wall and help prevent the pneumatic test plug 100 from becoming dislodged during testing. It should be noted that the ribs 128 may have any of a number of configurations of orientation, size, shape, etc. as compared to those in FIG. 2.

With continued reference to FIG. 2, the depicted embodiment of the bladder 102 has a generally cylindrical shape and may be constructed of an elastomeric rubber material. In some embodiments, the bladder may be constructed of various inflatable natural or synthetic materials and may have a variety of different shapes, including, but not limited to, generally spherical, ovoid, bottle, or pillow shaped.

In some embodiments, a portion of the open end 118 of the bladder wall 116 is configured to couple the housing 106. In some embodiments, an annular portion 130 of the bladder wall 116 engages and holds the housing 106 in position at or near the open end 118. The annular portion 130 may be an integral portion of the bladder wall 116 defined at the open end 118 of the bladder 102. In some embodiments, the annular portion 130 may be thicker and/or reinforced as compared to the remaining sections of the bladder wall 116. Referring to FIG. 2, the annular portion 130 and/or housing 106 may include one or more projections to hold the housing 106 in position and prevent pressure in the interior area 126 of the bladder 102 from pushing the housing and/or valve 104 out of the bladder 102. In some embodiments the annular portion 130 may include one or more projections 132 that engage a corresponding groove 134 of the housing. The housing 106 may additionally or alternatively include one or more flanges 136, 138 that engage the annular portion 130 to maintain the housing in the bladder 102. The flanges 136, 138 may engage an upper and/or lower surface of the annular portion 130. Alternatively, one or more of the flanges may engage a groove in the annular portion. A hose clamp 133 (shown in FIG. 1) may additionally or alternatively be used around the annular portion 130 to retain the housing 106 in the open end 118 of the bladder 102. The clamp 133 may compress the annular portion against the housing 102 to seal the bladder 102. As described below, the housing 106 may be made of a more rigid material than the bladder 102 so that the housing is secured in the bladder without collapsing the valve cavity 140.

As shown in FIGS. 2-3, the housing may have a first flange 136 and a second flange 138. The flanges 136, 138 may engage the annular portion 130 of the bladder 102 to secure the housing when the pneumatic test plug 100 is pressurized. The first flange 136 may engage the bladder 102 at the open end 118 to stop the housing 102 from sliding into the bladder and the second flange 138 may engage the bottom of the annular portion 130 to keep it from sliding out under pressure.

In some embodiments, the projections, flanges and/or grooves described herein may extend circumferentially around the open end 118 of the bladder 102. In some alternative embodiments, one or more of the projections, flanges, and/or grooves may extend partially around the circumference of the open end 118 of the bladder 102 or may be discrete features (e.g., pins or screws) that engage a specific opening in the bladder and/or housing. In yet another embodiment, the housing 106 may be molded into the open end 118 of the bladder 102 or inserted into a molded fitting in the open end such that the bladder wall 116 retains the housing therein. Some embodiments may include a compression ferrule to retain the bladder 102 between the ferrule and the housing. Any additional set of shapes or features may also be used to maintain the housing 106 in the open end 118 of the bladder 102. In some embodiments, the housing may be made of a stiffer material than the bladder.

In some alternative embodiments, the housing 106 may be an integral part of the bladder, such that the housing is a molded portion of the bladder 102 at the open end 118, or may be chemically bonded to the bladder at the open end. In these embodiments, the inflation valve 104 may be mounted directly to the housing-portion of the bladder. In yet another embodiment, the mounting surface may be a portion of the bladder wall 116 such that the inflation valve 104 is mounted directly to the wall and there is no cavity 140. Alternatively, the inflation valve 104 may be an integral part of the housing 106, such that the combined device is formed together and inserted into the bladder 102. In this embodiment, the inflation valve 104 may be integrally molded or formed as part of the housing 106 or may be fused to the housing after manufacturing (e.g., by chemical bonding).

Turning to FIG. 3, a portion of the housing 106 may then retain the inflation valve 104, such that the inflation valve 104 allows air to be added and/or removed from the interior area 126 of the pneumatic test plug 100. The housing may define a mounting surface 142 having a mounting opening 144 therein for receiving the inflation valve 104. The housing 106 may define a recessed valve cavity 140, which allows the inflation valve to be mounted to the mounting surface 142 between the open end 118 and the second end 120 of the bladder 102. A recessed housing 106 and mounting surface 142 may be configured to ease assembly and reduce unwanted rotation of the valve 104.

As detailed above, the housing 106 may include projections (e.g., flanges 136, 138) and/or grooves 134 to allow the housing to be fixed in the open end 118 of the bladder 102. The housing may further define a wall 146 to which the mounting surface 142 is connected. The wall 146 may be a substantially cylindrical shape, and may define the cavity 140. The wall 146 may be sufficiently rigid to outwardly resist the pressure of the annular portion 130 and/or clamp 133. The wall 146 may provide outward pressure against the annular portion 130 to facilitate a seal between the housing 106 and the bladder 102. Additionally or alternatively, o-rings, adhesives, seals, integral molding, or the like may be used to prevent air from escaping between the housing 106 and the bladder 102.

As detailed above, the housing 106 may define the cavity 140 as a void between the open end 118 of the bladder and the mounting surface 142. With reference to FIG. 2, the cavity 140 may be recessed within the bladder 102 such that at least a portion of the inflatable valve 104 is recessed within the open end 118, between the open end and the second, closed end 120 within the bladder 102. The cavity 140 may be in fluid communication with the external environment around the pneumatic test plug 100, such that air released from the release opening 148 may vent to the external environment to allow the inflation valve to fluidly communicate the external environment with the interior area 126 of the bladder 102. In some embodiments, as detailed below, the inflation valve 104 may be entirely disposed within the cavity 140, while in other embodiments, the inflation valve 104 may at least partially protrude from the open end 118. In some embodiments, as shown in FIG. 3, the top of the inflation valve 104 may be approximately (e.g., within typical engineering tolerances) flush with the top of the housing 106.

The mounting opening 144 may include one or more o-rings, washers, seals, or the like 146 for maintaining a seal between the mounting surface 142 and the inflation valve 104. The mounting surface 142 may additionally or alternatively include an indentation 150 for sealing the exterior of the inflation valve 104 to the mounting surface 142. As detailed below, the inflation valve 104 may further include a flange 162 to assist with sealing the valve to the housing 106. The flange 162 may cooperate with the indentation 150 to form a better seal. The flange 162 and indentation 150 may form corresponding circular shapes. In some embodiments, the indentation 150 and flange 162 may define a non-circular shape, such that the inflation valve 104 cannot rotate within the housing 102. For example, the indentation 150 and flange 162 may be a hex, square, triangular, oval, or other similar shape.

With reference to FIGS. 3 and 4, the inflation valve 104 may include an elongated stem portion 152 that defines a main air passageway 154 connecting the external environment at an exterior end 156 with the interior area 126 of the bladder 102 at an interior end 158. The stem 152 may be inserted into the mounting opening 144 and attached to the mounting surface 142 via a nut 160 threaded onto the interior end 158 of the stem. Alternatively, the stem 152 may be molded, threaded, adhered, or the like to the mounting surface 142. The stem 152 may further include the flange 162 on the exterior side of the mounting surface 142 such that tightening the nut 160 may seal the stem against the mounting surface. In some embodiments, the stem 152 and housing 106 may be threaded, such that the valve may be screwed into the housing. In some embodiments, the flange may include a taper, such that the taper of the flange rests against a corresponding taper of the indentation.

The main air passageway 154 is defined in the stem 152 and extends through the inflation valve 104. In the depicted embodiment the inflation valve 104 is constructed of a metal material, such as brass or stainless steel, however in other embodiments the inflation valve 104 may be constructed of other suitable materials, including, but not limited to, other metal materials, rigid plastic materials, composite materials, or combinations thereof such as, for example, metal fittings with plastic over-moldings.

The external end 156 of the main air passageway 154 is configured to receive a standard air pressure valve 168 (shown in FIG. 8) that is adapted to allow pressurized air to pass through the inflation valve 104 in order to inflate the bladder 102 through the main air passageway 154 and to trap the pressurized air in the interior area 126 of the bladder 102. The standard air pressure valve 168 is also configured to allow the bladder 102 to be manually depressurized. An example of such a device includes, but is not limited to, a pneumatic tire valve, as is used in automobile and bicycle tires. Although other embodiments may vary, a typical standard air pressure valve 168 is generally constructed of a metal material (such as brass or stainless steel) and may include an internal spring and one or more rubber seals. In the depicted embodiment, the standard air pressure valve 168 is insert-molded into the inflation valve 104 (e.g., a plastic inflation valve), however in various other embodiments the standard air pressure valve may be coupled to the inflation valve 104 in any other conventional manner. For example, an internal surface of the main air passageway 152 of the inflation valve 104 may be threaded to receive the standard air pressure valve 168, the standard air pressure valve may be press-fit into the inflation valve 104, or the standard air pressure valve may be adhered into the exterior opening 156 of the inflation valve 104.

The stem 152 may further include a release opening 148 connected to the main air passageway 154. The release opening 148 may be substantially perpendicular to the main air passageway, such that the release opening is disposed in a circumferential side wall of the stem 152, as shown in FIG. 3. In some embodiments, the stem 152 may include one release opening 148. In some other embodiments, the stem 152 may include two or more release openings. The two or more release openings may be substantially symmetrical around the stem. Alternatively, two or more release openings may be vertically separated along the length of the stem 152. The interior area 126 of the bladder 102 may be in fluid communication with the release opening 148 at all times, such that the pressure at the release opening substantially equals the pressure inside the bladder.

The inflation valve 104 may further include a sleeve 164 disposed around the stem 152. The sleeve 164 may be concentrically positioned around the main air passageway 154. The sleeve 164 may cover the release opening 148 such that air may not escape from the interior area 126 when the pneumatic test plug 100 is in an underinflated or inflated condition (e.g, when the pneumatic test plug is not overinflated). The entire inner surface of the sleeve 164 contacts an outer diameter of the stem portion, with the exception of the area in the sleeve at the pressure release opening 148.1 The sleeve 164 may be made of an elastic material having a predetermined flexibility to allow the sleeve to separate from the side wall of the stem when the pneumatic test plug 100 reaches a predetermined internal pressure (e.g., an overinflated condition). Once the pneumatic test plug 100 is overinflated (e.g., reaches or exceeds a predetermined internal pressure), the sleeve 164 may deflect outwardly from the stem 152 to allow air to exit the release opening 148. In this manner, the interior of the main air passageway 154 beneath the valve at the exterior end 156 may be sealed from the exterior environment until the predetermined maximum pressure is reached. In some alternative embodiments, a flap, ball-valve, or the like may be used.

The release opening 148 may be recessed within the cavity 140 below the open end 118 of the bladder 102. In some embodiments, an upper end 166 of the sleeve 164 may also be recessed within the cavity 140, as shown in FIG. 3. The sleeve 140 may also be customized to match the desired internal pressure of the pneumatic test plug 100. The sleeve may be made of an elastic material such as rubber, silicone, or the like. The pressure inside the pneumatic test plug 100 may be controlled by adjusting the thickness (e.g., inside and/or outside diameters) and/or elasticity of each sleeve 164.

In some embodiments the flange 162 of the stem 152 may include one or more openings configured to allow air to escape underneath the sleeve from between the sleeve 164 and the stem. In some other embodiments, air may escape only from the upper end 166 of the sleeve 164. The stem 152 may include a barb 153, lip, or the like to maintain the sleeve 164 on the stem. In some embodiments the inflation valve 104 detailed herein may be mounted directly to the bladder wall 116 (e.g., with no cavity).

FIG. 5 shows a typical section 10 of a pipe system that includes a clean-out tee 12 having an clean out port 14. The pipe section 10 is generally cylindrical and defines an internal pipe wall 16. The pneumatic test plug 100 of the depicted embodiment of the present invention is shown in an uninflated or underinflated condition and thus may be inserted into the pipe section 10 through the clean-out tee 12. Although these features are not shown in the figure, the pneumatic test plug 100 is configured to be connected to a pressurized air source (such as an air compressor, or a hand or foot pump) using an air hose or other flexible member adapted to supply pressurized air from the pressurized air source. The pneumatic test plug 100 may also include a handle device (as described above). It should be noted that although the pneumatic test plug 100 is shown in the figure as being used to block a portion of a vertical pipe section 10 above the clean-out tee 12, pneumatic test plugs of various embodiments of the present invention may be used in a variety of different orientations and thus may be used with various pipe systems having a variety of configurations, including, but not limited to, horizontal and angled pipe systems. It should also be noted that although the pneumatic test plug 100 is shown in the figure inserted through a clean-out tee access opening, pneumatic test plugs of various embodiments of the present invention may be inserted through other types of access openings, including, for example, roof vents, storm drains, closet bends, and pipe ends.

The pneumatic test plug 100 of the depicted embodiment is configured to be inflated from an uninflated condition to an inflated condition. The uninflated condition permits the pneumatic test plug 100 to be inserted or removed from the pipe section 10. The inflated condition permits the pneumatic test plug 100 to be used to test the pipe section 10 by sealing a portion of the pipe section 10. This allows the operator to introduce a fluid or gaseous test media (such as water or air) into the pipe section 10 above the pneumatic test plug 100. In the depicted embodiment, the pneumatic test plug 100 is configured to be inflated using the pressurized air source, which causes pressurized air to travel through the inflation valve 104 via the standard air pressure valve and into the interior area 126 of the bladder 102. As the bladder 102 continues to fill with pressurized air, the bladder wall 116 begins to expand outwardly eventually contacting the internal pipe wall 16 of the pipe section 10 to create a seal against the inner pipe wall 16. Pressurized air may continue to be introduced into the interior area 126 of the bladder 102 in order to exert more pressure against the internal pipe wall 16 of the pipe section 10.

FIG. 6 shows a cross-section view of the pipe section 10 and pneumatic test plug 100 in an overinflated condition. As noted above, existing pneumatic test plugs may be prone to problems when overinflated. However, the present invention solves this problem by allowing some of the pressurized air in the interior area 126 of the bladder 102 to vent to the environment when the pneumatic test plug is overinflated. In particular, as described herein, the overinflated condition causes the pressure inside the pneumatic test plug 100, as exerted against the sleeve 164 at the release opening 148, to deflect the sleeve and release air from the interior area of the bladder. Referring to the FIG. 6, since most of the bladder wall 116 is firmly pressed against the internal pipe wall 16 of the pipe section 10, as the pneumatic test plug 100 is inflated or overinflated it is configured such that the bladder wall 116 will expand outwardly and axially to increase the hold of the pneumatic test plug in the pipe. For example, with continued reference to FIG. 6, the bladder 102 may elongate axially during inflation or overinflation. As compared to FIG. 5, the side walls of the bladder wall 116 shown in the embodiment of FIG. 6 have elongated and increased the surface area of the bladder 102. The thickness stretched portions of the bladder wall 116 may decrease somewhat as a result of being elongated. An increase in length may increase the size of the contact surface against the inside of the pipe and improve the hold with the inside of the pipe, such that the pneumatic test plug 100 is able to withstand a greater pressure from within the pipe. In some embodiments, the ribs 128 (labeled in FIG. 2) may separate farther from one another during the elongation. In such embodiments, additional surface area between the ribs may be available for contact with the pipe 10. In some embodiments, the closed end 120 (shown in FIG. 2) of the inflatable bladder 102 may be thicker than the sides of the bladder wall 116 to facilitate the elongation.

If the overinflation condition occurs while filing the pneumatic test plug 100, air may automatically bypass the interior area 126 of the bladder 102 and be discharged from the release opening in the stem. In this manner, some embodiments of the present invention may automatically stop filling when they reach the predetermined maximum pressure even if additional air is being added to the exterior end 156. Once an appropriate pressure has been reached, the sleeve 164 may return to an undeflected position and may again seal the release opening 148 to maintain the inflated condition of the test plug.

FIG. 7 shows an exploded view of the pneumatic test plug 100 in accordance with an embodiment of the present invention. In some embodiments, the pneumatic test plug 100 may be assembled by affixing the stem 152 to the mounting surface 142 (shown in FIGS. 2-4) of the housing 106 via the nut 160. The sleeve 140 may be inserted over the stem 152 within the cavity 140. The housing 106 and inflation valve 104 assembly may then be inserted into the bladder 102, such that the housing 106 aligns with the annular portion 130. In some embodiments, the clamp 133 may be attached around the annular portion 130 to further secure the housing 106.

FIG. 8 is a cross-section view of an inflation valve 104 that may be used with the embodiments of the pneumatic test plug 100 discussed herein. As shown in FIG. 8, the sleeve 164 may have an internal diameter that is less than the external diameter of the stem 152. In this configuration, the seal may be formed by stretching the sleeve 164 over the stem 152 during assembly. In some embodiments, the sleeve 164 may include one or more ribs on an inner wall.

In some of the embodiments described above, overinflation of the bladder 102 releases air into the environment by causing the sleeve 164 to deflect away from the stem 152. However, in other embodiments of the present invention, the sleeve may uncover a release opening in other ways, for example, by sliding to uncover the release opening or bending an exhaust flap.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A pneumatic test plug for use with a pipe having a generally cylindrical internal pipe wall, the pneumatic test plug comprising:
   an inflatable bladder formed by a bladder wall that is elastically deformable, the bladder wall having at least one open end;
   a housing disposed in the open end of the bladder wall, the housing having a mounting surface; and
   an inflation valve mounted to the mounting surface, the inflation valve having an interior end in fluid communication with an interior area of the bladder, the inflation valve defining a main air passageway through which air is introduced into the interior area;
   wherein the mounting surface is recessed into the interior area of the bladder relative to the open end in the bladder wall such that the housing defines a recessed valve cavity within the inflatable bladder,
   wherein a majority of the inflation valve is disposed within the recessed valve cavity of the housing,
   wherein the inflation valve further comprises a stem portion configured to engage the mounting surface, a pressure release opening, and a sleeve disposed about the stem portion,
   wherein the stem portion passes through an entire length of the sleeve, and
   wherein, with the exception of the pressure release opening, an entire inner surface of the sleeve contacts an outer diameter of the stem portion.

2. The pneumatic test plug of claim 1, wherein the pressure release opening is fluidly connected to the main air passageway.

3. The pneumatic test plug of claim 1, wherein the pressure release opening is defined in the stem portion such that the sleeve portion is configured to seal the pressure release opening when the inflatable bladder is not overinflated.

4. The pneumatic test plug of claim 3, wherein the sleeve portion is configured to deflect away from the stem portion when the inflatable bladder is overinflated such that air is released from the interior area of the inflatable bladder to an exterior environment.

5. The pneumatic test plug of claim 1, wherein the pressure release opening is disposed within the valve cavity of the housing, such that the pressure release opening is also recessed into the interior area of the bladder relative to the open end.

6. The pneumatic test plug of claim 1, wherein the inflation valve further comprises a fill opening configured to receive air to inflate the bladder.

7. The pneumatic test plug of claim 1, wherein the bladder wall further comprises an annular portion proximate the open end that is configured to retain the housing.

8. The pneumatic test plug of claim 7, further comprising a clamp disposed about the annular portion such that the clamp is configured to compress the bladder wall to retain the housing.

9. The pneumatic test plug of claim 1, wherein the bladder is configured to elongate during inflation.

10. The pneumatic test plug of claim 9, wherein a portion of the bladder wall disposed at a closed end of the bladder opposite the open end is thicker than at least a portion of a remainder of the bladder wall.

11. An inflation valve assembly for use with an inflatable bladder formed by a bladder wall that is elastically deformable, the bladder having at least one open end, the inflation valve assembly comprising:
    a housing disposed in the open end of the bladder wall, the housing having a mounting surface; and
    an inflation valve mounted to the mounting surface, the inflation valve comprising:
        an interior end configured to fluidly communicate with an interior area of the bladder;
        a main air passageway configured to introduce air into the interior area;
        a stem portion comprising a pressure release opening; wherein the pressure release opening is fluidly connected to the main air passageway, wherein the stem portion is configured to engage the mounting surface; and
        a sleeve disposed about the stem portion, wherein the stem portion passes through an entire length of the sleeve, and wherein, with the exception of the pressure release opening, an entire inner surface of the sleeve contacts an outer diameter of the stem portion;
    wherein the mounting surface is configured to be recessed into the interior area of the bladder relative to the open end in the bladder wall such that the housing is configured to define a valve cavity within the inflatable bladder.

12. The inflation valve assembly of claim 11, wherein the sleeve portion is configured to seal the pressure release opening when the inflatable bladder is not overinflated.

13. The inflation valve assembly of claim 11, wherein the sleeve portion is configured to deflect away from the stem portion when the inflatable bladder is overinflated such that the inflation valve is configured to release air from the interior area of the inflatable bladder to an exterior environment.

14. The pneumatic test plug of claim 11, wherein the pressure release opening is disposed within the valve cavity of the housing, such that the pressure release opening is also recessed into the interior area of the bladder relative to the open end.

15. The pneumatic test plug of claim 11, wherein the inflation valve further comprises a fill opening configured to receive air to inflate the bladder.

* * * * *